(12) United States Patent
Yang et al.

(10) Patent No.: US 12,375,418 B2
(45) Date of Patent: Jul. 29, 2025

(54) DEVICE AND METHOD OF HANDLING REAL-TIME DATA TRANSMISSION

(71) Applicant: Moxa Inc., New Taipei (TW)

(72) Inventors: Chang-Mou Yang, New Taipei (TW); Hsu-Yao Tsai, New Taipei (TW)

(73) Assignee: Moxa Inc., New Taipei (TW)

( * ) Notice: Subject to any disclaimer, the term of this patent is extended or adjusted under 35 U.S.C. 154(b) by 354 days.

(21) Appl. No.: 17/888,518

(22) Filed: Aug. 16, 2022

(65) Prior Publication Data

US 2023/0388243 A1 Nov. 30, 2023

(30) Foreign Application Priority Data

May 31, 2022 (TW) .................................. 111120167

(51) Int. Cl.
*H04L 47/56* (2022.01)
*H04L 27/26* (2006.01)
*H04L 47/628* (2022.01)

(52) U.S. Cl.
CPC .......... *H04L 47/56* (2013.01); *H04L 27/2605* (2013.01); *H04L 47/628* (2013.01)

(58) Field of Classification Search
None
See application file for complete search history.

(56) References Cited

U.S. PATENT DOCUMENTS

| 4,764,920 | A | 8/1988 | Furuya |
| 10,412,769 | B2 | 9/2019 | Cherian et al. |
| 2010/0329133 | A1 | 12/2010 | Hao |
| 2016/0087766 | A1* | 3/2016 | Sun ...................... H04L 27/2605 |
| 2017/0290033 | A1* | 10/2017 | Blasco Serrano .... H04W 72/12 |
| 2019/0052442 | A1* | 2/2019 | Kim ....................... H04W 72/02 |
| 2020/0112941 | A1 | 4/2020 | Yerramalli |
| 2021/0120551 | A1 | 4/2021 | Meylan |
| 2022/0256593 | A1* | 8/2022 | Wang ..................... H04W 72/02 |
| 2022/0272678 | A1* | 8/2022 | Zhang .................... H04W 72/02 |
| 2023/0061794 | A1* | 3/2023 | Livne ...................... H04L 47/56 |
| 2023/0262805 | A1* | 8/2023 | Kneckt ................. H04W 76/15 |
| 2023/0344740 | A1* | 10/2023 | Peng ....................... H04L 47/28 |
| 2023/0371060 | A1* | 11/2023 | Wu ......................... H04L 47/56 |

FOREIGN PATENT DOCUMENTS

| CN | 110214422 | 11/2020 |
| TW | 317057 | 10/1997 |
| WO | 99/66748 | 12/1999 |

* cited by examiner

*Primary Examiner* — Gregory B Sefcheck
*Assistant Examiner* — Benjamin Peter Welte
(74) *Attorney, Agent, or Firm* — Winston Hsu (57) ABSTRACT

A first communication device for handling a real-time data transmission includes an identification module for identifying at least one first real-time data, and for storing at least one first arrival time of the at least one first real-time data; a prediction module for predicting a second arrival time of a second real-time data according to the at least one first arrival time and a prediction algorithm in order to generate a first prediction result; a scheduling module for scheduling the second real-time data according to the first prediction result to generate a first scheduling result; a reservation module for reserving a transmission resource according to the first scheduling result; and a transmission module for transmitting the second real-time data according to the first scheduling result via the transmission resource.

14 Claims, 5 Drawing Sheets

DEVICE AND METHOD OF HANDLING REAL-TIME DATA TRANSMISSION

CROSS REFERENCE TO RELATED APPLICATION

This application claims priority of Taiwan Application No. 111120167 filed on May 31, 2022, which is incorporated herein by reference.

BACKGROUND OF THE INVENTION

1. Field of the Invention

The present invention relates to a device and a method used in a communication system, and more particularly, to a device and a method of handling real-time data transmission.

2. Description of the Prior Art

In a wireless communication system, a channel used for data transmission is shared. Thus, a communication device competes for a transmission channel for obtaining a right to transmit data on the channel after the data arrives (to be transmitted). Competing for the transmission channel causes a delay in the data transmission, however, and the resulting collision further increases this delay.

A time-division multiplexing (TDM) has been proposed to solve the problem of collision caused by competing for the transmission channel. In the TDM, the communication device needs to wait for a time slot to be allocated to the communication device before transmitting the data on the channel. Waiting for the time slot to arrive may also cause a delay in the data transmission.

The above delays make it difficult for the communication device to complete real-time data transmission or even to begin transmitting the data in real time. Thus, how to handle the real-time data transmission is a problem to be solved in this field.

SUMMARY OF THE INVENTION

The present invention therefore provides a device and a method of handling real-time data transmission, to solve the problems present in the prior art.

A first communication device for handling a real-time data transmission includes an identification module for identifying at least one first real-time data, and for storing at least one first arrival time of the at least one first real-time data; a prediction module, coupled to the identification module, for predicting a second arrival time of a second real-time data according to the at least one first arrival time and a prediction algorithm in order to generate a first prediction result; a scheduling module, coupled to the prediction module, for scheduling the second real-time data according to the first prediction result to generate a first scheduling result; a reservation module, coupled to the scheduling module, for reserving a transmission resource according to the first scheduling result; and a transmission module, coupled to the reservation module, for transmitting the second real-time data according to the first scheduling result via the transmission resource.

A method of handling a real-time data transmission for a first communication device includes identifying at least one first real-time data, and storing at least one first arrival time of the at least one first real-time data; predicting a second arrival time of a second real-time data according to the at least one first arrival time and a prediction algorithm in order to generate a first prediction result; scheduling the second real-time data according to the first prediction result to generate a first scheduling result; reserving a transmission resource according to the first scheduling result; and transmitting the second real-time data according to the first scheduling result via the transmission resource.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
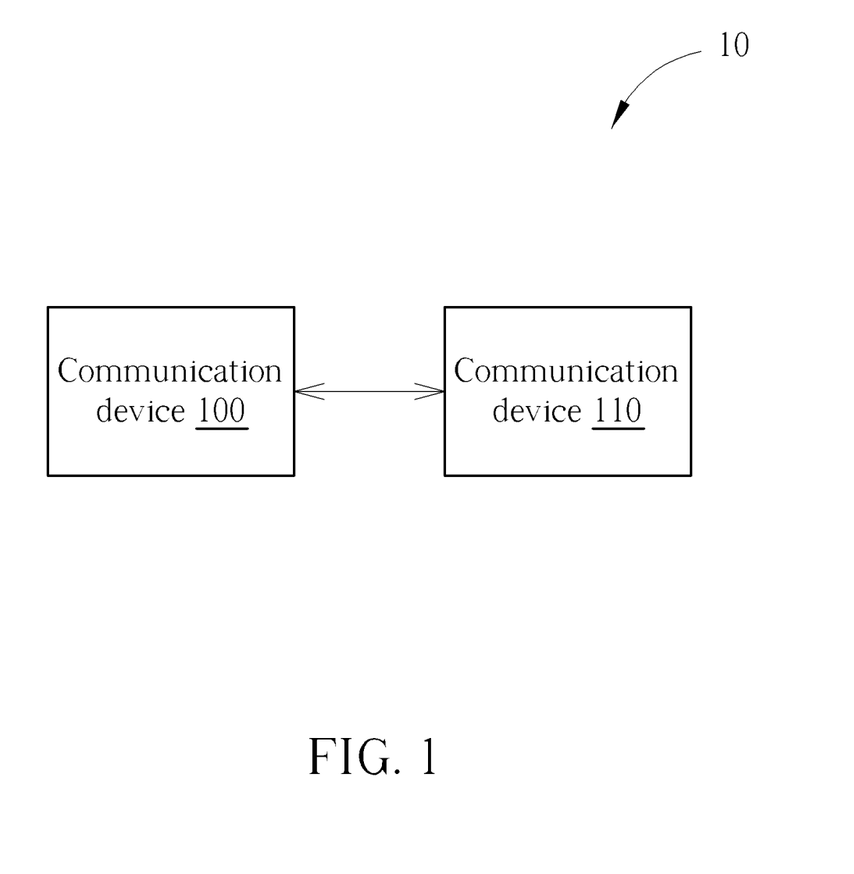
FIG. 1 is a schematic diagram of a communication device according to an example of the present invention.

FIG. 1 is a schematic diagram of a communication system 10 according to an example of the present invention. The communication system 10 may be a wireless communication system, e.g. a wireless local area network (WLAN), but is not limited thereto. In addition, the wireless communication system 10 may include a communication device 100 and a communication device 110. In detail, the communication device 100 may be a station (STA) in the WLAN, e.g. a client, although not limited thereto. The communication device 110 may be an access point (AP) in the WLAN, e.g. a wireless microcontroller (MCU), although not limited thereto. As shown in FIG. 1, the communication device 100 and the communication device 110 may communicate with each other. In one example, the communication device 100 may connect to the communication system 10 via accessing the communication device 110.

The above communication devices may support the Institute of Electrical and Electronics Engineers (IEEE) 802.11 standard (e.g. IEEE 802.11e, 802.11n, 802.11ac, 802.11ax or later versions). The above communication devices may be realized by a user equipment (UE), a low-cost device (e.g. machine type communication (MTC)), a device-to-device (D2D) communication device, a narrow-band internet of things (IoT) (NB-IoT) device, a power device, a Wireless Fidelity (Wi-Fi) wireless processor, a server, a mobile phone, various types of computers (e.g. a desktop, a laptop, a tablet), an e-book and a portable computer system, or combination thereof, and are not limited thereto.

Figure 2:
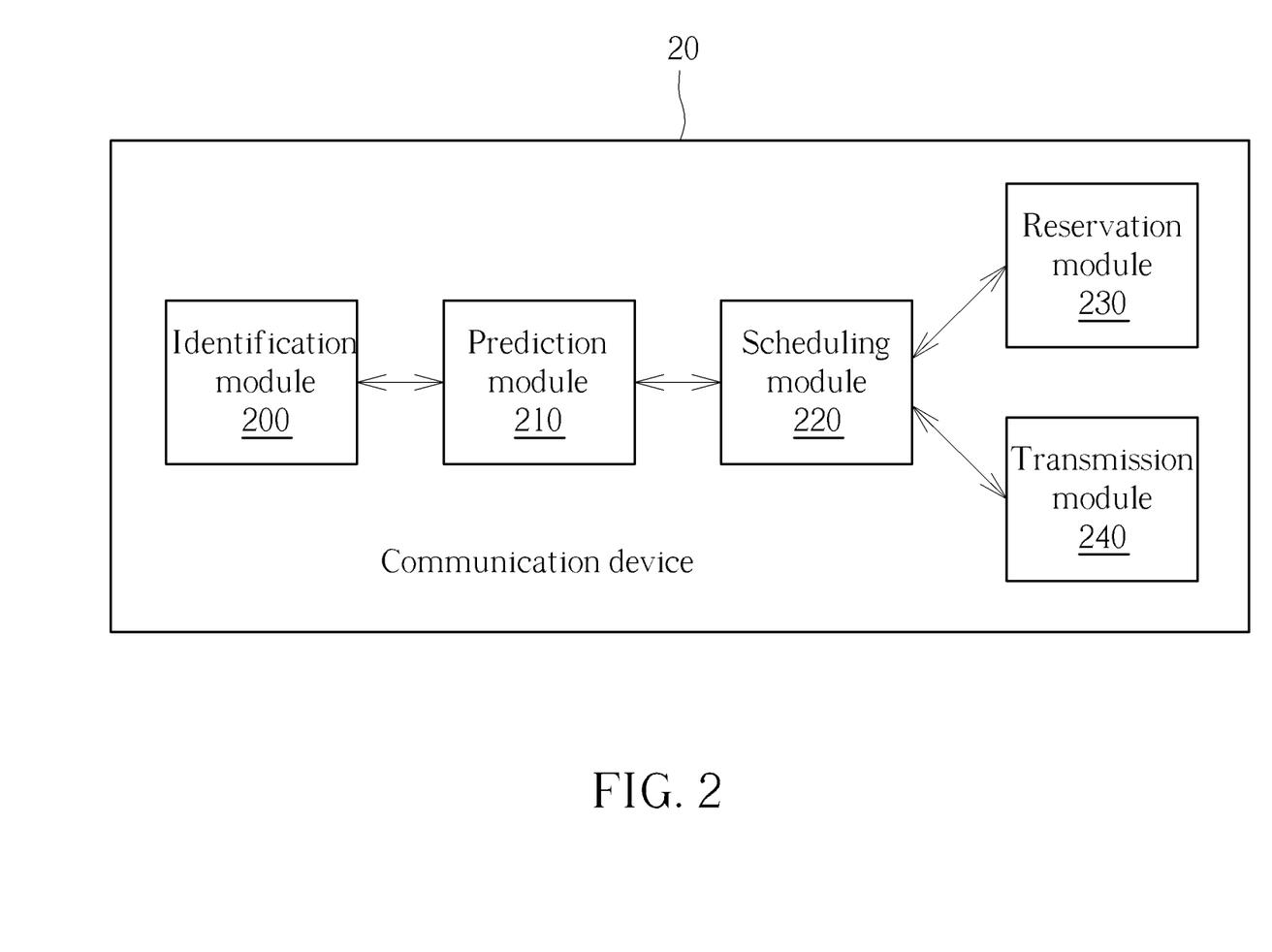
FIG. 2 is a schematic diagram of a communication device according to an example of the present invention.

FIG. 2 is a schematic diagram of a first communication system according to an example of the present invention, and may be used for realizing the communication device 110 in FIG. 1, for handling real-time data transmission. The first communication system 20 may include an identification module 200, a prediction module 210, a scheduling module 220, a reservation module 230 and a transmission module 240. In detail, the identification module 200 may be used for identifying (e.g. recognizing or distinguishing) at least one first real-time data, and may be used for storing (e.g. recording) at least one first arrival time of the at least one first real-time data. The prediction module 210 may be coupled to the identification module 200, and may be used for predicting a second arrival time or time period of second real-time data (e.g. the next real-time data) according to the at least one first arrival time and a prediction algorithm, to generate a first prediction result. The scheduling module 220 may be coupled to the prediction module 210, and may be used for scheduling the second real-time data according to the first prediction result in order to generate a first scheduling result. The reservation module 230 may be coupled to the scheduling module 220, and may be used for reserving a transmission resource according to the first scheduling result. The transmission module 240 may be coupled to the scheduling module 220, and may be used for transmitting the second real-time data according to the first scheduling result via the transmission resource. That is, the first communication device 20 may schedule the second real-time data in advance and may reserve the transmission resource for transmitting the second real-time data in advance before the second real-time data arrives (to be transmitted), according to the first prediction result. Thus, the first communication device 20 may compete for a transmission channel in advance before the second real-time data arrives, rather than starting to compete for the transmission channel after the second real-time data arrives. As a result, a time at which the first communication device 20 competes for the transmission channel may be advanced to before the arrival of the second real-time data, to thereby reduce a delay in the second real-time data transmission.

In one example, the operation of the identification module 200 identifying the at least one first real-time data may include: the identification module 200 determines whether at least one data and a real-time data configuration are consistent (e.g. the same) to generate at least one comparison result, and the identification module 200 determines that the at least one data is the at least one first real-time data (e.g., to identify the at least one first real-time data), when the at least one comparison result indicates that the at least one data and the real-time data configuration are consistent. In one example, the real-time data configuration may include an Ethernet type, e.g. "0x8892" for representing the Industrial Ethernet protocol (PROFINET protocol) or "0x88AB" for representing the Industrial Ethernet Protocol Software Solutions (POWERLINK). In one example, the real-time data configuration may include a differentiated services code point (DSCP), e.g. "255". In one example, the real-time data may be predetermined.

In one example, the identification module 200 may receive the at least one data via a wired network interface. In one example, the transmission module 240 may transmit the second real-time data via a wireless network interface. In one example, the identification module 200 may store the at least one first arrival time in a database of the first communication device 20. In one example, the prediction module 210 may retrieve the at least one first arrival time from the database of the first communication device 20.

In one example, the at least one first real-time data and the second real-time data may include the same protocol and tuple. That is, the identification module 200 may identify data flows (e.g. the above at least one first real-time data and the second real-time data) to separately record an arrival time of each of the data flows according to supported protocols and preconfigured tuples of the data flows. The supported protocols and the preconfigured tuples of the data flows may include a destination media access control (MAC) address, a virtual local area network (VLAN) tag, a source internet protocol (IP) address, a destination IP address, a source port number, a destination port number, a transport protocol, an Internet Control Message Protocol (ICMP) identifier, or combination thereof, and is not limited thereto. According to real-time data including a protocol and tuple, the prediction module 210 may predict an arrival time (or time period) of the next real-time data including the same protocol and tuple.

In one example, the prediction module 210 may be used for predicting a second arrival time (or time period) of the second real-time data according to at least one first burst size or at least one first burst size count of the at least one first real-time data, to generate the first prediction result. In one example, the prediction module 210 may be used for predicting the second arrival time (or time period) of the second real-time data according to a protocol in a header of an IP version (e.g. IP version 4 (IPv4)), to generate the first prediction result. The IP version may be included in the real-time data configuration. In one example, the first prediction result may include a second burst size or a second burst size count of the second real-time data.

In one example, the prediction algorithm may include an exponentially weighted moving average (EWMA). In one example, the prediction algorithm may include a moving average. In one example, the prediction module 210 may calculate an average value of at least one time difference between the at least one first arrival time according to the moving average, to predict the second arrival time (or period) of the second real-time data. In one example, the prediction algorithm may include a regression algorithm.

In one example, the scheduling module 220 may schedule the second real-time data according to a size of the second real-time data, to generate the first scheduling result.

In one example, the transmission module 240 may transmit (e.g. periodically) a first trigger message to a second communication device (e.g. the communication device 100 in FIG. 1), to trigger the second communication device to transmit a third prediction result of third real-time data to the first communication device 20. In one example, the identification module 200 may receive the third prediction result of the third real-time data from the second communication device. In one example, the scheduling module 220 may schedule the third real-time data according to the third prediction result, to generate a second scheduling result. In one example, the reservation module 230 may reserve a transmission resource according to the second scheduling result. In one example, the transmission module 240 may transmit a second trigger message to the second communication device according to the second scheduling result, to trigger the second communication device to transmit the third real-time data to the first communication device 20 via the transmission resource. That is, the first communication device 20 may schedule the third real-time data in advance and may reserve the transmission resource for transmitting the third real-time data in advance before the third real-time data arrives (to be transmitted by the second communication device) according to the third prediction result. Thus, the first communication device 20 may compete for a transmission channel in advance and transmit the second trigger message to the second communication device before the third real-time data arrives, rather than starting to compete for the transmission channel and transmit the trigger message to the second communication device after the third real-time data arrives. As a result, a time at which the first communication device 20 competes for the transmission channel may be advanced to before the arrival of the third real-time data, to thereby reduce a delay in the third real-time data transmission. In one example, the first trigger message or the second trigger message may include a trigger basic frame, which is used for notifying or requesting the second communication device to perform transmission (e.g. uplink (UL) transmission).

In one example, the second communication device may include an identification module for identifying at least one fourth real-time data, and for storing at least one fourth arrival time of the at least one fourth real-time data. The second communication device may include a prediction module for predicting the third arrival time (or time period) of the third real-time data (e.g. the next real-time data) according to the at least one fourth arrival time and the prediction algorithm, to generate the third prediction result. In one example, the second communication device may transmit (e.g. periodically) the third prediction result to the first communication device 20. In one example, the second communication device may notify the first communication device 20 in advance of transmitting the real-time data within a predetermined time according to a transmission mode selected by the second communication device. Then, the second communication device may transmit a clear to send (CTS) by itself to reserve a transmission channel, and may transmit the real-time data by itself in the reserved transmission channel.

In one example, the scheduling module 220 may schedule the second real-time data (or the third real-time data) according to wireless network environment information, to generate the first scheduling result (or the second scheduling result), wherein the wireless network environment information may include a quality of a wireless network channel or a load (e.g. reserved status) of the wireless network channel, a utilization of the wireless network channel or the number of STAs on the wireless network channel.

In one example, the scheduling module 220 may schedule the second real-time data (or the third real-time data) according to real-time information, to generate the first scheduling result (or the second scheduling result), wherein the real-time information may include a priority configuration of the second real-time data (or the third real-time data) such as a priority code point (PCP) or the DSCP, historical transmission information of the second real-time data (or the third real-time data) such as a transmission rate or a transmission mode or a real-time requirement of the second real-time data (or the third real-time data) such as the maximum end-to-end delay.

In one example, the first scheduling result may include a transmission mode, a transmission time, a transmission channel or a resource unit allocation of an orthogonal frequency division multiple access (OFDMA) for transmitting the second real-time data. In one example, the first scheduling result may include calculating and controlling a transmission time of other data (e.g. non-real-time data) in advance, stopping the transmission of the other data (e.g. non-real-time data) in advance, listening to the transmission channel in advance (e.g. via performing a wireless channel carrier sense) or competing for the transmission channel in advance (e.g. via a request to send (RTS) mechanism, a CTS mechanism or configuring (e.g. setting) a priority parameter of the second real-time data to a high priority. In one example, the transmission mode may include the OFDMA (e.g. single-user OFDMA, multi-user OFDMA, UL OFDMA) or a multi-user multiple-input multiple-output (MU-MIMO). In one example, the scheduling module 220 may select at least one transmission mode to transmit the second real-time data. In one example, the first scheduling result may include a transmission mode, a transmission time, a transmission channel or a resource unit allocation of an OFDMA for transmitting a plurality of real-time data. In one example, the first scheduling result may include simultaneously transmitting the second real-time data on wireless links, channels, or resource units. In one example, the first scheduling result may include a wireless link, a channel or a resource unit for retransmitting the second real-time data, wherein the wireless link, the channel or the resource unit for retransmitting the second real-time data and a wireless link, a channel or a resource unit for transmitting the second real-time data may be the same or different.

In one example, the scheduling module 220 may reserve a guard time before the transmission time of transmitting the second real-time data according to the first scheduling result, for all communication devices to stop transmitting in the guard time. In one example, for the same basic service set (BSS) or a managed overlapping BSS (OBSS), the scheduling module 220 may reserve a guard time via calculating and controlling transmission time of other data (e.g. non-real-time data) in advance or stopping the transmission of the other data (e.g. non-real-time data) in advance. In one example, for an unmanaged OBSS, the scheduling module 220 may reserve a guard time via using data with a high priority (e.g. an arbitrary frame interval number (AIFSN) in a priority parameter is configured to 1 (i.e. AIFSN=1)) in advance, or via configuring the minimum contention window (CW) and the maximum CW in the priority parameter to 0 (i.e. CWmin=CWmax=0)) to compete for the transmission channel, transmitting RTS data or CTS data to the second communication device after obtaining the transmission channel, and configuring a duration field of the RTS data or the CTS data to the latest time to complete the transmission of the second real-time data.

In one example, the transmission module 240 may transmit CTS data to the second communication device for informing the second communication device to stop transmitting in a guard time. In one example, the transmission module 240 may stop transmitting in the guard time.

In one example, the first communication device 20 and the second communication device may perform timing synchronization according to a timing synchronization mechanism. In one example, the timing synchronization mechanism may include a timing synchronization function (TSF), a timing measurement (TM) or a fine timing measurement (FTM), and is not limited thereto.

Figure 3:
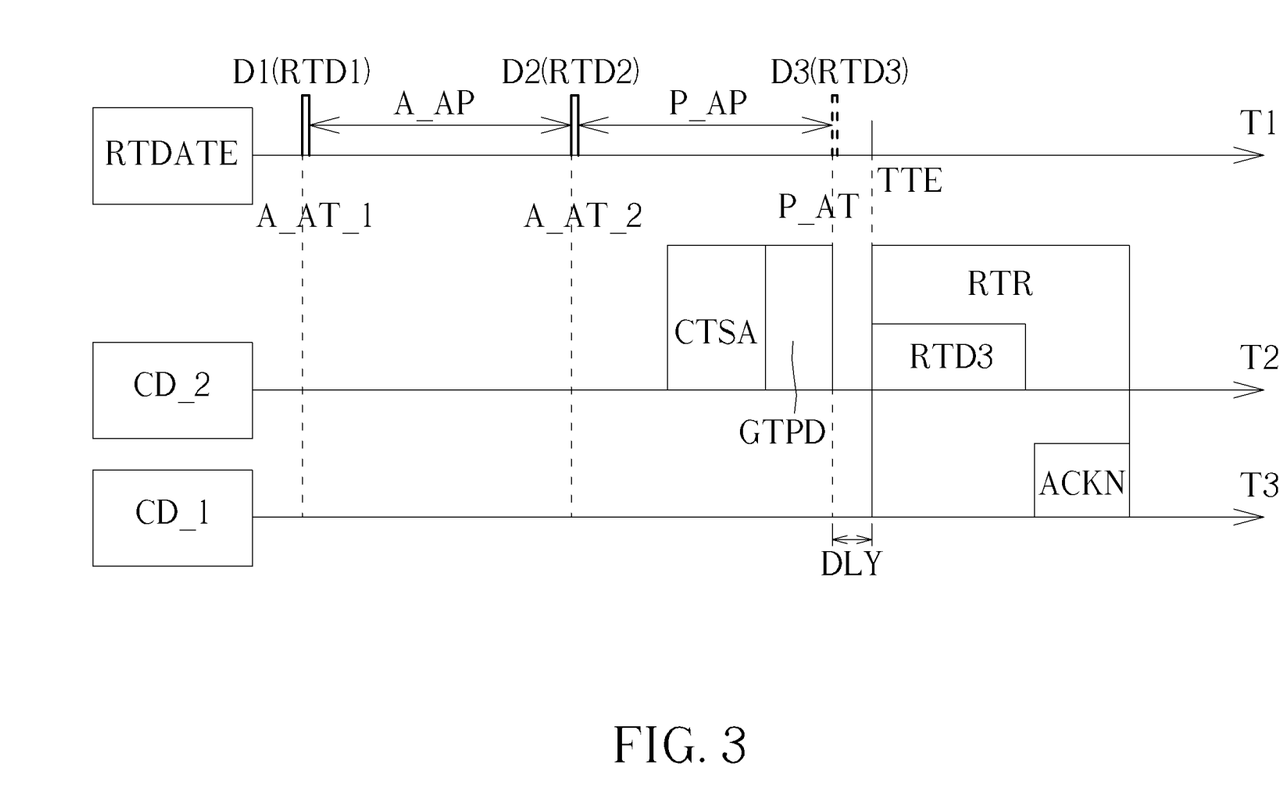
FIG. 3 is a schematic diagram of handling real-time data transmission according to an example of the present invention.

FIG. 3 is a schematic diagram of handling real-time data according to an example of the present invention, wherein the communication device CD_1 may be used for realizing the communication device 100 in FIG. 1, and the communication device CD_2 may be used for realizing the communication device 110 in FIG. 1 or the first communication device 20 in FIG. 2; or the communication device CD_1 may be used for realizing the communication device 110 in FIG. 1 or the first communication device 20 in FIG. 2, and the communication device CD_2 may be used for realizing the communication device 100 in FIG. 1. FIG. 3 shows a time axis T1 for representing an arrival time RTDATE of real-time data, a time axis T2 for representing an operation time of the communication device CD_2, and a time axis T3 for representing an operation time of the communication device CD_1. The time axis T1, the time axis T2 and the time axis T3 are synchronized. As shown in FIG. 3, at a time A_AT_1, the communication device CD_2 receives data D1 and identifies it as real-time data RTD1, and records an arrival time of the real-time data RTD1 as the time A_AT_1.

At a time A_AT_2, the communication device CD_2 receives data D2 and identifies it as real-time data RTD2, and records an arrival time of the real-time data RTD2 as the time A_AT_2. According to the moving average, the communication device CD_2 calculates an average value (e.g. 10 microseconds (ms)) of a time difference A_AP (e.g. 10 ms) between the time A_AT_1 and the time A_AT_2, to predict an arrival time (e.g. time to be transmitted) of real-time data RTD3 being a time P_AT (e.g. the time A_AT_2 plus the average value) or a period P_AP (e.g. receiving the real-time data per average value).

According to the predicted arrival time P_AT or the period P_AP of the real-time data RTD3, the communication device CD_2 schedules the real-time data RTD3 (e.g. schedules in advance ahead of the predicted arrival time P_AT of the real-time data RTD3), to generate a scheduling result. The scheduling result includes a transmission time TTE for transmitting the real-time data RTD3. According to the scheduling result, the communication device CD_2 reserves a transmission resource RTR for transmitting the real-time data RTD3, reserves a guard time GTPD before the transmission time TTE for transmitting the real-time data RTD3, and transmits a CTS data CTSA to the communication device CD_1 (or other communication device on a transmission channel), for the communication device CD_1 (or the other communication device on the transmission channel) to stop transmitting in the guard time GTPD. The communication device CD_2 transmits the real-time data RTD3 to the communication device CD_1 according to the scheduling result via the transmission resource RTR. The communication device CD_1 transmits an acknowledgment message ACKN in response to the transmission of the real-time data RTD3, after the communication device CD_2 transmits the real-time data RTD3.

As shown in FIG. 3, the communication device CD_2 schedules the transmission of the real-time data RTD3 in advance and reserves the transmission resource RTR ahead of the predicted arrival time P_AT of the real-time data RTD3. Thus, the communication device CD_2 may compete for a transmission channel in advance before the real-time data RTD3 arrives (e.g. to be transmitted), rather than starting to compete for the transmission channel after the real-time data RTD3 arrives. As a result, a time at which the communication device CD_2 competes for the transmission channel may be advanced to before the time P_AT, and a delay in the transmission of the real-time data RTD3 is reduced to a time difference DLY between the time P_AT and the transmission time TTE.

Figure 4:
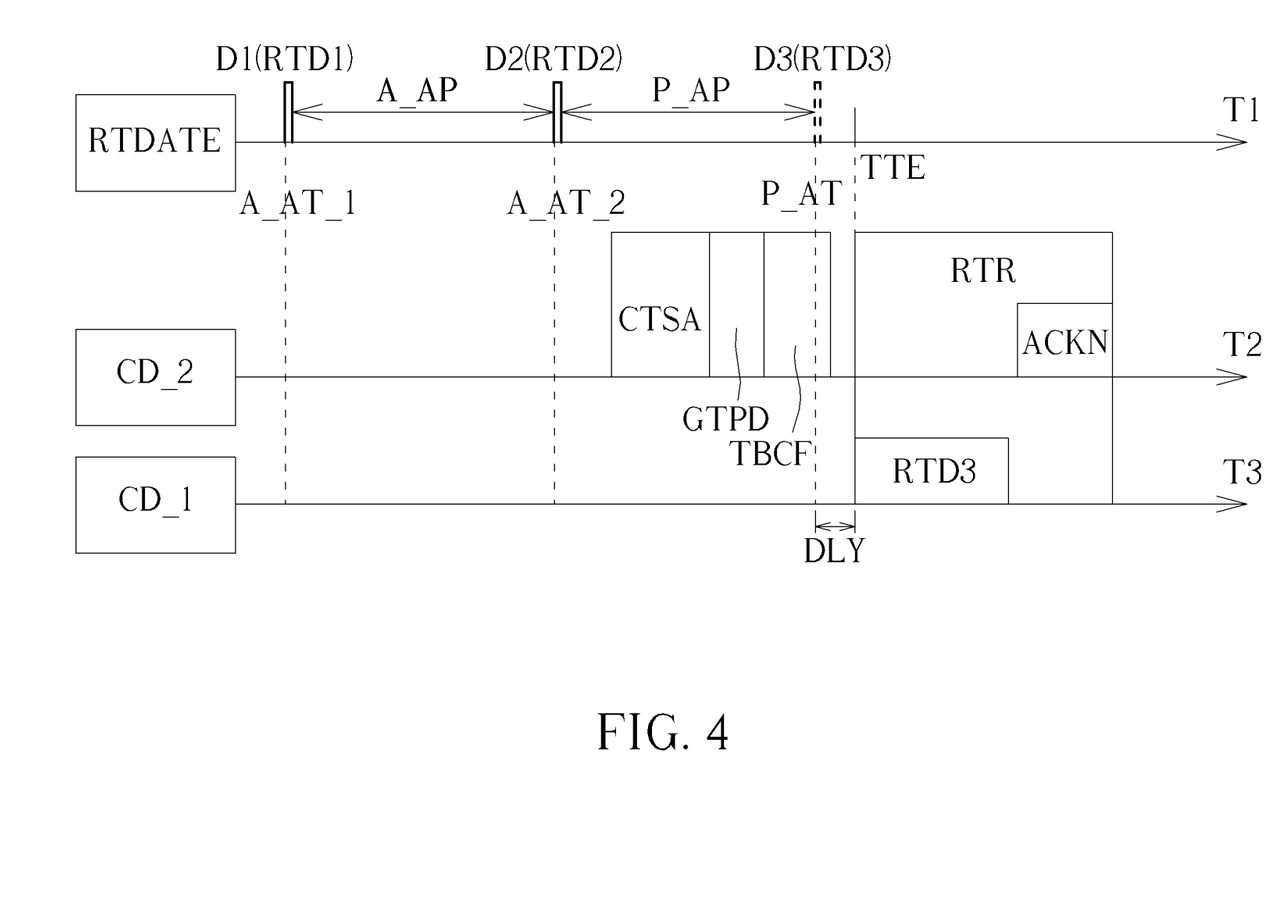
FIG. 4 is a schematic diagram of handling real-time data transmission according to an example of the present invention.

FIG. 4 is a schematic diagram of handling real-time data according to an example of the present invention, wherein the communication device CD_1 may be used for realizing the communication device 100 in FIG. 1, and the communication device CD_2 may be used for realizing the communication device 110 in FIG. 1 or the first communication device 20 in FIG. 2. FIG. 4 shows a time axis T1 for representing an arrival time RTDATE of real-time data, a time axis T2 for representing an operation time of the communication device CD_2, and a time axis T3 for representing an operation time of the communication device CD_1. The time axis T1, the time axis T2 and the time axis T3 are synchronized. As shown in FIG. 4, at a time A_AT_1, the communication device CD_1 receives data D1 and identifies it as real-time data RTD1, and records an arrival time of the real-time data RTD1 as the time A_AT_1. At a time A_AT_2, the communication device CD_1 receives data D2 and identifies it as real-time data RTD2, and records an arrival time of the real-time data RTD2 as the time A_AT_2. According to the moving average, the communication device CD_1 calculates an average value (e.g. 10 ms) of a time difference A_AP (e.g. 10 ms) between the time A_AT_1 and the time A_AT_2, to predict an arrival time (e.g. time to be transmitted) of real-time data RTD3 being a time P_AT (e.g. the time A_AT_2 plus the average value) or a period P_AP (e.g. receiving the real-time data per average value).

The communication device CD_1 transmits the predicted arrival time P_AT or the period P_AP of the real-time data RTD3 to the communication device CD_2. According to the predicted arrival time P_AT or the period P_AP of the real-time data RTD3, the communication device CD_2 schedules the real-time data RTD3 (e.g. schedules in advance ahead of the predicted arrival time P_AT of the real-time data RTD3), to generate a scheduling result. The scheduling result includes a transmission time TTE for the communication device CD_1 to transmit the real-time data RTD3. According to the scheduling result, the communication device CD_2 reserves a transmission resource RTR for the communication device CD_1 to transmit the real-time data RTD3, reserves a guard time GTPD before the transmission time TTE for the communication device CD_1 to transmit the real-time data RTD3, and transmits a CTS data CTSA to the communication device CD_1 (or other communication device on a transmission channel), for the communication device CD_1 (or the other communication device on the transmission channel) to stop transmitting in the guard time GTPD. Then, the communication device CD_2 transmits a trigger basic frame TBCF to the communication device CD_1, to trigger the communication device CD_1 to perform transmitting (e.g. UL transmission of the real-time data RTD3).

The communication device CD_1 transmits the real-time data RTD3 to the communication device CD_2 according to the trigger basic frame TBCF via the transmission resource RTR. The communication device CD_2 transmits an acknowledgment message ACKN in response to the transmission of the real-time data RTD3, after the communication device CD_1 transmits the real-time data RTD3.

As shown in FIG. 4, the communication device CD_2 schedules the transmission of the real-time data RTD3 in advance and reserves the transmission resource RTR ahead of the predicted arrival time P_AT of the real-time data RTD3. Thus, the communication device CD_2 may compete for a transmission channel in advance before the real-time data RTD3 arrives at the communication device CD_1 (e.g. to be transmitted by the communication device CD_1), and rather than starting to compete for the transmission channel after the real-time data RTD3 arrives at the communication device CD_1. As a result, a time at which the communication device CD_2 competes for the transmission channel may be advanced to before the time P_AT, and a delay in the transmission of the real-time data RTD3 is reduced to a time difference DLY between the time P_AT and the transmission time TTE.

It should be noted that, in FIG. 3 and FIG. 4, the communication device CD_2 may wait for a period of time (e.g. a short inter-frame spacing (SIFS)) and proceed to the next transmission after the communication device CD_2 performs each transmission. As shown in FIG. 3 and FIG. 4, the time difference DLY may be approximately the same as a time interval for which the communication device CD_2 waits.

Figure 5:
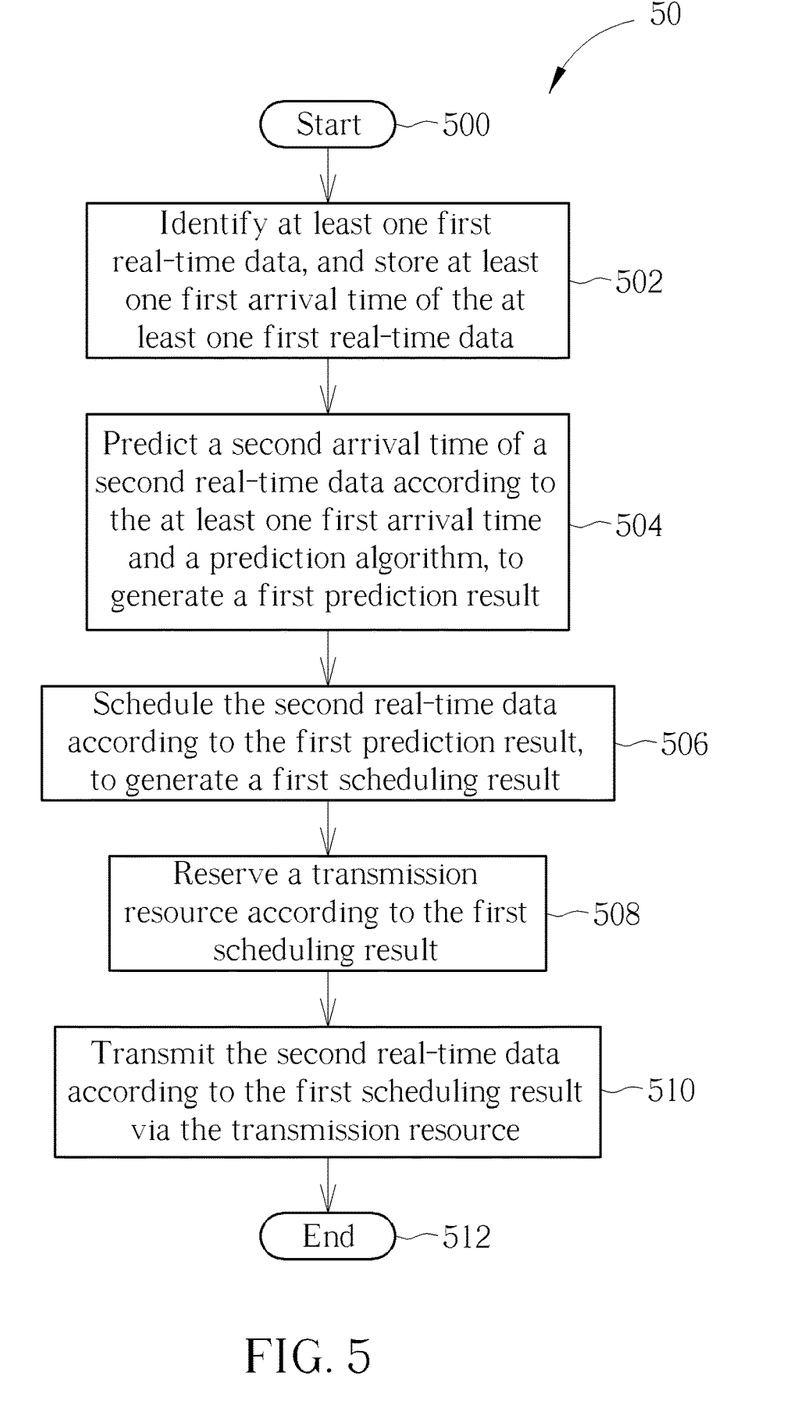
FIG. 5 is a flowchart of a process according to an example of the present invention.

Operations of the first communication device 20 in the above examples can be summarized into a process 50 shown in FIG. 5. The process 50 may be realized in the first communication device 20, and includes the following steps:

Step 500: Start.

Step 502: Identify at least one first real-time data, and store at least one first arrival time of the at least one first real-time data.

Step 504: Predict a second arrival time of a second real-time data according to the at least one first arrival time and a prediction algorithm, to generate a first prediction result.

Step 506: Schedule the second real-time data according to the first prediction result, to generate a first scheduling result.

Step 508: Reserve a transmission resource according to the first scheduling result.

Step 510: Transmit the second real-time data according to the first scheduling result via the transmission resource.

Step 512: End.

The process 50 is used for illustrating the operation of the first communication device 20. Detailed description and variations of the process 50 can be understood by referring to the above description, and are not narrated herein.

The above data may include a packet, a frame or a signal, and are not limited thereto. The above "arrival time" refers to a time when real-time data arrives at a MAC layer of a communication device.

The above actual values are only used for illustrating the present invention, and are not limitations to the present invention. The above "first", "second", "third" and "fourth" are for distinguishing related terms, and are not for limiting the order of related terms.

The above term "include" may be replaced by "is". The above term "determine" may be replaced by "compute", "calculate", "obtain", "generate", "output" or "use". The above "according to" may be replaced by "by using". The above "via" may be replaced by "on" or "in". The above term "time" may be replaced by "time point", "time instant" or "timing".

Those skilled in the art should readily make combinations, modifications and/or alterations on the abovementioned description and examples. The abovementioned description, modules and/or processes (including suggested steps) can be realized by means that could be hardware, software, firmware (known as a combination of a hardware device and computer instructions and data that reside as read-only software on the hardware device), an electronic system, or combination thereof. Realizations of the present invention may include the first communication device 20 or the second communication device. Realizations of the first communication device 20 (and the modules therein) are various. For example, the abovementioned devices may be integrated into one or more modules.

Examples of the hardware may include analog circuit(s), digital circuit(s) and/or mixed circuit(s). For example, the hardware may include application-specific integrated circuit(s) (ASIC(s)), field programmable gate array(s) (FPGA(s)), programmable logic device (s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g. stored) in a storage unit, e.g. a computer-readable medium. The computer-readable medium may include Subscriber Identity Module (SIM), Read-Only Memory (ROM), flash memory, Random Access Memory (RAM), CD-ROM/ DVD-ROM/BD-ROM, magnetic tape, hard disk, optical data storage device, non-volatile storage unit, or combination thereof. The computer-readable medium (e.g. storage unit) may be coupled to at least one processor internally (e.g. integrated) or externally (e.g. separated). The at least one processor which may include one or more modules may (e.g. be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a device and a method of handling real-time data transmission. Compared with the prior art, the communication device in the present invention predicts the arrival time of the real-time data, and schedules the transmission of the real-time data and reserves the transmission resource according to the prediction. Accordingly, the communication device may compete for the transmission channel in advance before the real-time data arrives, rather than starting to compete for the transmission channel after the real-time data arrives. Thus, the time at which the communication device competes for the transmission channel may be advanced, to thereby reduce the delay in the real-time data transmission. As a result, the delay in the real-time data transmission is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first communication device for handling a real-time data transmission, comprising;
   an identification module, for identifying at least one first real-time data, and for storing at least one first arrival time of the at least one first real-time data;
   a prediction module, coupled to the identification module, for predicting a second arrival time of a second real-time data according to the at least one first arrival time and a prediction algorithm in order to generate a first prediction result;
   a scheduling module, coupled to the prediction module, for scheduling the second real-time data according to the first prediction result to generate a first scheduling result;
   a reservation module, coupled to the scheduling module, for reserving a transmission resource according to the first scheduling result; and
   a transmission module, coupled to the reservation module, for transmitting the second real-time data according to the first scheduling result via the transmission resource;
   wherein the operation of identifying the at least one first real-time data comprises:
     determining whether at least one data and a real-time data configuration are consistent in order to generate at least one comparison result; and
     determining that the at least one data is the at least one first real-time data when the at least one comparison result indicates that the at least one data and the real-time data configuration are consistent;
   wherein the transmission module is further configured to transmit a clear to send (CTS) data to a second communication device for informing the second communication device to stop transmitting in a guard time before transmitting the second real-time data;

wherein the identification module is further configured to receive a third prediction result of a third real-time data from the second communication device, and the third prediction result is predicted by the second communication device according to data received by the second communication device;

wherein the scheduling module is further configured to schedule the third real-time data according to the third prediction result to generate a second scheduling result.

2. The first communication device of claim 1, wherein the real-time data configuration comprises an Ethernet type.

3. The first communication device of claim 1, wherein the real-time data configuration is predetermined.

4. The first communication device of claim 1, wherein the prediction algorithm comprises an exponentially weighted moving average (EWMA), a moving average or a regression algorithm.

5. The first communication device of claim 1, wherein the scheduling module is further configured to perform the following operation:

scheduling the second real-time data according to a size of the second real-time data to generate the first scheduling result.

6. The first communication device of claim 1, wherein the transmission module is further configured to perform the following operation:

transmitting a first trigger message to the second communication device, to trigger the second communication device to transmit the third prediction result of the third real-time data.

7. The first communication device of claim 1, wherein the transmission module is further configured to perform the following operation:

transmitting a second trigger message to the second communication device according to the second scheduling result to trigger the second communication device to transmit the third real-time data to the first communication device.

8. The first communication device of claim 1, wherein the first scheduling result comprises a transmission mode, a transmission time, a transmission channel or a resource unit allocation of an orthogonal frequency division multiple access (OFDMA) for transmitting the second real-time data.

9. The first communication device of claim 8, wherein the transmission mode comprises the OFDMA or a multi-user multiple-input multiple-output (MU-MIMO).

10. The first communication device of claim 1, wherein the transmission module is further configured to perform the following operation:

stopping transmitting in the guard time.

11. A method of handling a real-time data transmission for a first communication device, comprising;

identifying at least one first real-time data, and storing at least one first arrival time of the at least one first real-time data;

predicting a second arrival time of a second real-time data according to the at least one first arrival time and a prediction algorithm in order to generate a first prediction result;

scheduling the second real-time data according to the first prediction result to generate a first scheduling result;

reserving a transmission resource according to the first scheduling result; and transmitting the second real-time data according to the first scheduling result via the transmission resource;

wherein the method further comprises:

determining whether at least one data and a real-time data configuration are consistent to generate at least one comparison result; and determining that the at least one data is the at least one first real-time data in response to the at least one comparison result indicating that the at least one data and the real-time data configuration are consistent;

wherein the method further comprises transmitting a clear to send (CTS) data to a second communication device for informing the second communication device to stop transmitting in a guard time before transmitting the second real-time data;

wherein the method further comprises:

receiving a third prediction result of a third real-time data from the second communication device, and the third prediction result is predicted by the second communication device according to data received by the second communication device; and scheduling the third real-time data according to the third prediction result to generate a second scheduling result.

12. The method of claim 11, further comprising:

scheduling the second real-time data according to a size of the second real-time data to generate the first scheduling result.

13. The method of claim 11, further comprising:

transmitting a first trigger message to the second communication device to trigger the second communication device to transmit the third prediction result of the third real-time data;

and transmitting a second trigger message to the second communication device according to the second scheduling result to trigger the second communication device to transmit the third real-time data to the first communication device.

14. The method of claim 11, further comprising:

stopping transmitting in the guard time.

* * * * *